United States Patent Office 3,138,391
Patented June 23, 1964

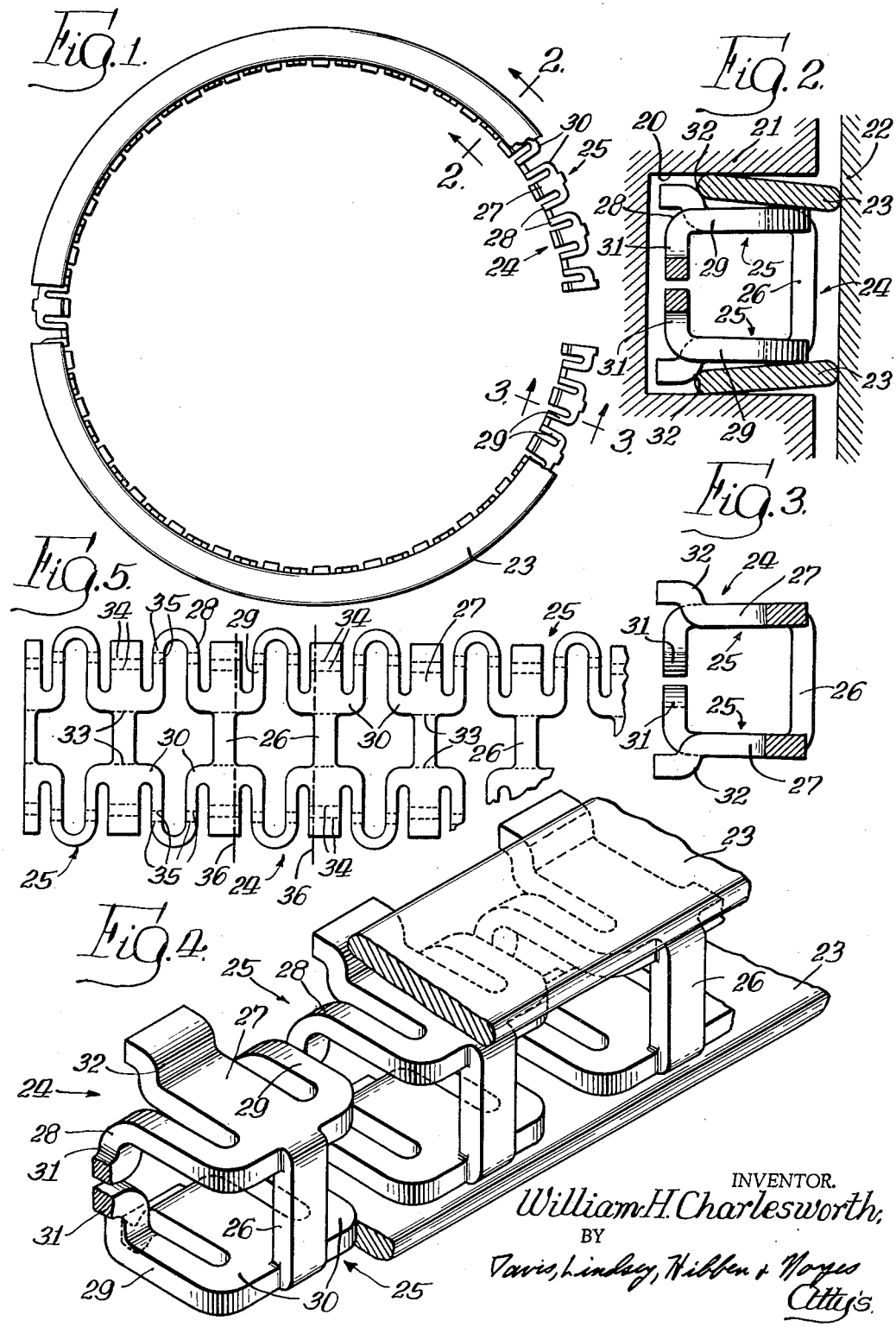

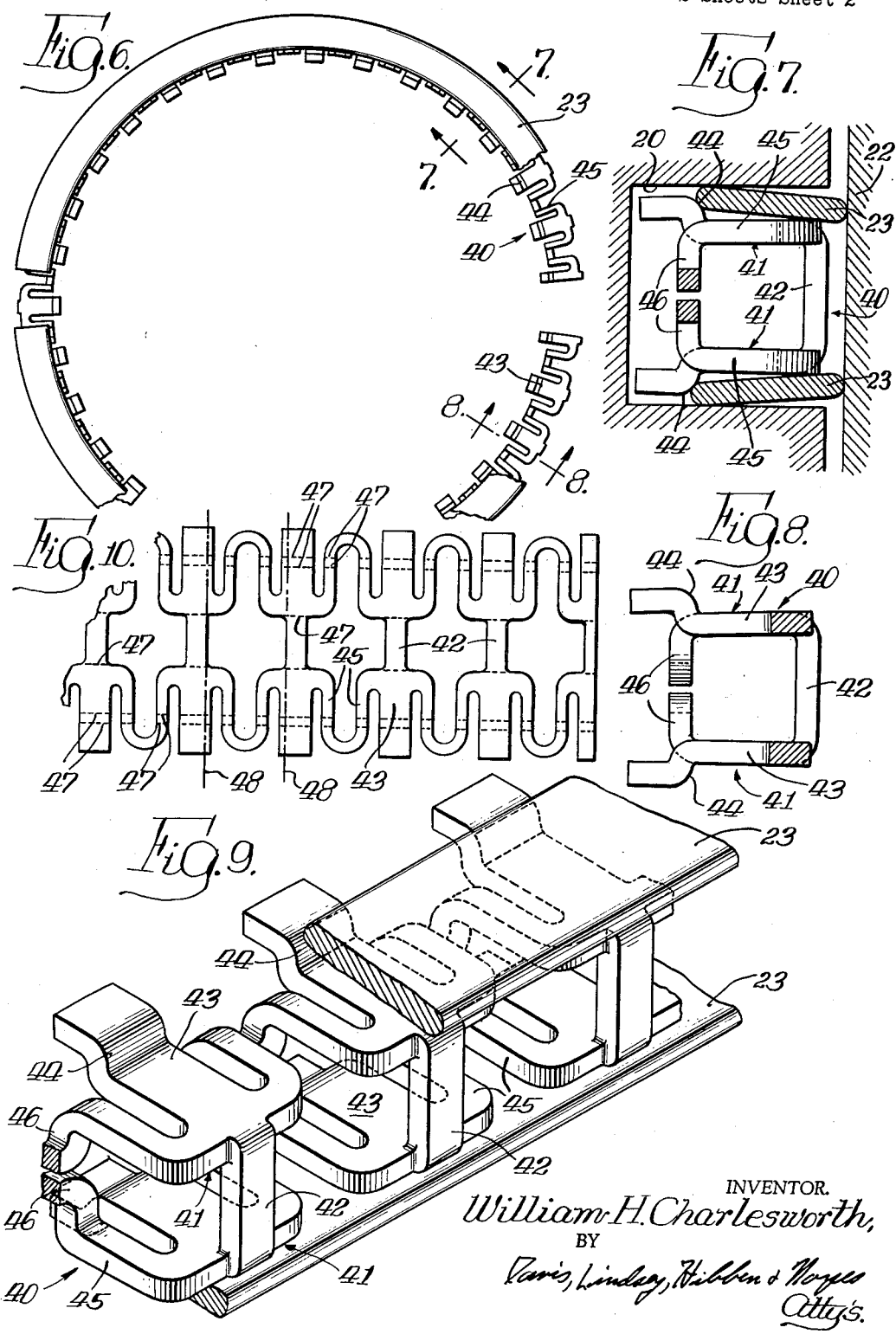

3,138,391
PISTON RING ASSEMBLY
William H. Charlesworth, New Castle, Ind., assignor, by mesne assignments, to Perfect Circle Corporation, Hagerstown, Ind., a corporation of Indiana
Filed Jan. 29, 1962, Ser. No. 169,581
5 Claims. (Cl. 277—140)

The invention relates generally to piston rings and more particularly to an oil ring assembly.

The general object of the invention is to provide a novel piston ring assembly adapted for use in a small bore engine where the piston ring groove is relatively shallow.

Another object is to provide a novel piston ring assembly comprising one or more rails, and positioning and expanding means for the rail or rails, said means having a structure that is relatively sturdy to prevent crushing.

Another object is to provide a novel piston ring assembly comprising a pair of rails and a spacer-expander which provides the desired spring rate to expand the rails and yet is so constructed that the assembly may be used in a relatively shallow piston ring groove.

Still another object is to provide a novel spacer-expander for a pair of rails, which is of box-like construction to render it sturdy.

A still further object is to provide a novel spacer-expander for a pair of rails, which includes spring elements providing a desired spring rate but shaped to permit use in a relatively shallow groove.

A further object is to provide a novel spacer-expander having the foregoing features and which may be readily manufactured from sheet metal.

Other objects and advantages will become apparent from the following description, taken in connection with the accompanying drawings, in which:

FIG. 1 is a plan view of a piston ring assembly embodying the features of the invention, with a portion broken away;

FIG. 2 is an enlarged sectional view taken on the line 2—2 of FIG. 1 and showing the ring assembly mounted in a piston and cylinder;

FIG. 3 is an enlarged sectional view taken on the line 3—3 of FIG. 1 and showing the spacer-expander forming part of the ring assembly shown in FIGS. 1 and 2;

FIG. 4 is an enlarged fragmentary perspective view of the ring assembly;

FIG. 5 is an enlarged fragmentary view of a strip of sheet metal punched in a manner to form the spacer-expander shown in FIG. 3; and FIGS. 6, 7, 8, 9 and 10 are views respectively similar to FIGS. 1, 2, 3, 4 and 5 but showing a modified form of ring assembly.

A ring assembly embodying the features of the invention is adapted for use as an oil ring on a piston of an internal combustion engine. The ring assembly is of the type comprising a circumferentially expansible spacer-expander and a pair of cylinder-engaging rails, the spacer-expander holding the rails axially spaced adjacent the respective sides of the groove in the piston and engaging the inner peripheries of the rails to force them against the cylinder wall under pressure.

The spacer-expander comprises a pair of spring structures which function independently of each other and independently exert pressure on the respective rails. The two spring structures are located adjacent the respective rails to support them axially and are connected to each other solely by axially extending struts. The struts thus may be so dimensioned and so spaced from one another that large openings for the flow of oil through the spacer-expander are provided and clogging is prevented. The struts do not exert any spring load so that their dimensioning and spacing is determined chiefly by the size of openings desired therebetween. The spring structures, however, may be dimensioned to exert the desired load on the rails.

The spacer-expander in each of the two embodiments disclosed herein is made of sheet metal, a strip of such metal being punched or cut to provide the spring structures and struts and then bent along longitudinally extending lines to provide a generally U-shape cross section. The spring elements of the spring structures have their inner portions bent axially toward each other, to give the spacer-expander a box-like form in cross section. When so formed, the strip may be given a circular shape and cut to the desired length. When the spacer-expander is placed in its groove in the piston in association with the rails, its ends are in abutment with one another so that it tends to expand circumferentially when compressed in a cylinder. The spring structures further include rail-supporting members which push outwardly on the rails and may be shaped for use with rails of different radial width. Due to the box-like form, the spacer-expander is relatively sturdy and may be used in a relatively shallow groove.

The embodiment of the invention shown in FIGS. 1 to 5 is illustrated in FIG. 2 as being mounted in a groove 20 in a piston shown fragmentarily at 21, the piston being located in a cylinder fragmentarily shown at 22. The ring assembly of this embodiment comprises a pair of cylinder engaging rails 23 and a spacer-expander indicated generally at 24. The rails are of the type usually used in ring assemblies of this general character and are shown as having rounded edges.

The spacer-expander 24 comprises a pair of flat spring structures, each indicated generally at 25, which are axially spaced from each other to hold the rails adjacent the respective sides of the groove 20. The two spring structures 25 are held in such spaced relation by a plurality of circumferentially spaced axially extending struts 26 integrally connected to and located at the outer periphery of the spring structures. The spring structures 25 function independently of each other and, in addition to holding the rails 23 adjacent the respective sides of the groove 20, are provided with means engaging the inner periphery of each rail 23 to force them outwardly against the wall of the cylinder 22 with the desired pressure.

Each spring structure, in the present instance, comprises a set of radially extending rail-supporting members 27 integrally connected at their outer ends to, and radially aligned with, the struts 26. Circumferentially connecting the members 27 are a plurality of spring elements 28 having radially extending portions 29 which lie in the same general plane with the associated set of rail-supporting members 27. In this embodiment of the invention, the spring elements 28 are U-shaped and open outwardly, the ends of the arms of the U being turned outwardly of the U and circumferentially of the ring, as shown at 30, and integrally connected to the members 27 adjacent the outer ends thereof. The inner ends of the spring elements 28 are bent axially toward each other as shown in FIGS. 2, 3 and 4 to form axially extending portions 31. The ends of the portions 31 could meet, but for manufacturing reasons the ends are spaced a short distance apart, the spacing being relatively small but being exaggerated in FIGS. 2 and 3.

The inturned axially extending portions 31, together with the radially extending portions 29 and the struts 26 form a box-like structure that is sturdy and resists crushing that might occur when the piston ring assembly is assembled on the piston by machine. The axially extending portions 31 also provide sufficient length for the arms of the U to give a desired spring rate. The point of bend between the axially extending portions 31 and the radially extending portions 29, and hence the length of the portions 29, may be varied to vary the spring rate.

The rail-supporting members 27 are provided with means for engaging the inner periphery of the associated rails 23. Thus, each member 27 adjacent its inner end is bent axially outward and then radially inward to provide an outwardly facing shoulder 32 adapted to abut the inner periphery of the rail to force it outwardly. The shoulder 32 is preferably at a small angle to an axially extending line to provide a component of force urging the inner periphery of the rail against the side of the groove 20 to form a seal therewith. The point at which the shoulder 32 is formed may be varied for use with rails of different radial widths. The inner portion of each rail-supporting member 27 extends inwardly from the shoulder sufficiently to give the ring assembly sufficient radial width to prevent the rail structure from slipping out of the groove when the piston is being inserted into the cylinder.

Thus, with the present spacer-expander, the point at which the shoulder 32 is located may be varied independently of the point at which the bend between the portions 31 and 29 occurs. The spacer-expander may therefore be made for use with rails of different radial width and may be made with varying spring rates.

The spacer-expander 24 is formed from a strip of sheet metal punched or cut as shown in FIG. 5. The strip is then formed into a cross-sectional U-shape by bending at the dotted lines 33 where the rail-supporting members 27 are connected to the struts 26. To form the shoulders 32, the rail-supporting members 27 are bent on lines indicated by the dotted lines 34. To form the axially extending portions 31 of the spring elements 28, the inner ends of the spring elements 28 are bent toward each other on the lines indicated by the dotted lines 35. When the formed strip is cut to a length sufficient to form a ring of a desired diameter, such cut is made at a point in the ring where a maximum end surface is obtained so that the ends of the spacer-expander 24 when in abutment will have full bearing against each other. In the present instance, such cuts are made on transverse lines indicated by the dash dot lines 36 in FIG. 5.

In the embodiment of the invention shown in FIGS. 1 to 5, the shoulders 32 are positioned for use with rails of relatively narrow radial width and the rail-supporting members 27 extend inwardly from the shoulders 32 only a short distance so that the assembly can be used in a relatively shallow groove. The embodiment of the invention illustrated in FIGS. 6 to 10 on the other hand is made for use in a somewhat deeper groove and with a rail of somewhat greater radial width. In FIGS. 6 to 10, a spacer-expander is indicated generally at 40 and is similar to the spacer-expander 24 illustrated in FIGS. 1 to 5. The spacer-expander 40 comprises a pair of independently functioning flat spring structures, each indicated generally at 41, connected by axially extending struts 42 at the outer periphery of the spacer-expander. Each spring structure comprises a set of rail-supporting members 43, each having a portion radially aligned with and integrally connected to a strut 42, and means, in the form of a shoulder 44, adjacent its inner end to engage the inner periphery of the associated rail to force it outwardly, the shoulder 44 being at a small angle to an axially extending line to provide a component of force urging the inner periphery of the rail against the side of the groove to form a seal therewith.

The rail-supporting members 43 are connected by generally U-shaped spring elements 45. Each spring element 45 has each of its radially extending arms connected to the outer end of the portion of one rail-supporting member 43 that is connected to a strut 42. Once again, the inner end of each spring element 45 is bent to form an axially extending portion 46. The portions 46 of the spring elements 45 are spaced a short distance apart for the same reason as in the other embodiment, the distance being shown as exaggerated in FIGS. 7 and 8.

The spacer-expander 40 is again made from an elongated strip of sheet metal, similarly to the first described form of spacer-expander. Thus, the strip is punched or cut as shown in FIG. 10 and is bent on longitudinally extending lines, illustrated by the dotted lines 47 in FIG. 10, resulting in the structures shown in FIGS. 7 and 8. It is then formed into a circle and cut to the desired length, the cuts being made on the dash and dot lines 48 shown in FIG. 10 for purposes heretofore described in connection with the first form of spacer-expander.

The embodiment of FIGS. 6 to 10 functions similarly to the embodiment shown in FIGS. 1 to 5 but may be used in a groove that is somewhat deeper than groove shown in connection with the first form. The second form has a box-like construction which renders it relatively sturdy and, by comparison with the first form, illustrates how the structure may be varied to accommodate rails of a different radial width. It is also evident that the spring rate of the spring elements 45 may be changed by varying the length of the radially extending portions of the spring elements and, within limits, such change may be made independently of any variation made to accommodate a rail of a predetermined radial width. Both embodiments provide a ring assembly which may be used in a relatively shallow groove and which is therefore suitable for use in a small bore engine.

1. claim:

1. A spacer-expander for a piston ring assembly including a pair of rails, comprising a pair of axially spaced circumferentially expansible spring structures, axially extending struts connecting said spring structures at their outer edges, said spring structures having inner portions bent axially toward each other and forming a box-like structure with said struts, said spring structures including rail supporting portions connected by spring elements, and the inner portions of said spring elements being bent axially toward each other to form said box-like structure.

2. A spacer-expander for a piston ring assembly including a pair of rails, comprising a plurality of axially extending circumferentially spaced struts, a pair of independently functioning axially spaced spring structures connected to the respective ends of said struts, each spring structure comprising a plurality of rail-supporting members extending radially inward, each member comprising a portion radially aligned with one of said struts and an axially offset portion to engage a rail and spring elements connecting said members, each of said elements having a radially extending portion and an axially extending portion at its inner end and forming a generally rectangular box-like structure with said axially extending struts and said radially extending portions of said elements.

3. A spacer-expander as in claim 2, wherein each spring element is U-shaped with the arms of the U bent to provide said radially extending portion and said axially extending portion.

4. A spacer-expander as in claim 2, wherein said axially extending portions of said spring elements of the respective spring structures extend axially toward each other and in axial alignment with one another, to support said spring structures against crushing during installation.

5. A piston ring assembly comprising a pair of cylinder engaging rails, and a spacer-expander for holding said rails axially spaced and for forcing said rails outwardly, said spacer-expander comprising a pair of circumferentially expansible spring structures having a plurality of circumferentially spaced radially extending portions connected at their outer ends by axially extending struts, and a plurality of spring elements having radially extending portions connecting said circumferentially-spaced portions of each of said spring structures, said spring elements of each of said structures further having portions at the inner ends of said radially extending portions extending axially toward and in alignment with each other and forming a box-like structure.

References Cited in the file of this patent

UNITED STATES PATENTS 3,024,029 Brenneke _____ Mar. 6, 1962

FOREIGN PATENTS 536,852 Great Britain _____ May 29, 1941
1,234,984 France _____ May 23, 1960